(12) United States Patent
Kandori et al.

(10) Patent No.: US 8,336,380 B2
(45) Date of Patent: Dec. 25, 2012

(54) ANGULAR VELOCITY SENSOR

(75) Inventors: Atsushi Kandori, Ebina (JP); Masao Majima, Isehara (JP); Kenichi Nagae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 488 days.

(21) Appl. No.: 12/304,966

(22) PCT Filed: Jul. 26, 2007

(86) PCT No.: PCT/JP2007/065108
§ 371 (c)(1),
(2), (4) Date: Dec. 15, 2008

(87) PCT Pub. No.: WO2008/018347
PCT Pub. Date: Feb. 14, 2008

(65) Prior Publication Data
US 2009/0193893 A1    Aug. 6, 2009

(30) Foreign Application Priority Data
Aug. 9, 2006   (JP) .................................. 2006-216694

(51) Int. Cl.
*G01C 19/56* (2012.01)
(52) U.S. Cl. ..................................................... 73/504.12
(58) Field of Classification Search ................ 73/504.12
See application file for complete search history.

(56) References Cited

U.S. PATENT DOCUMENTS

| | | | |
|---|---|---|---|
| 2,797,580 A | 7/1957 | Taylor | |
| 4,598,585 A * | 7/1986 | Boxenhorn | ................ 73/504.12 |
| 5,488,862 A * | 2/1996 | Neukermans et al. | ..... 73/504.02 |
| 5,955,668 A | 9/1999 | Hsu et al. | |
| 5,987,986 A | 11/1999 | Wyse et al. | ................ 73/504.12 |
| 6,374,672 B1 | 4/2002 | Abbink et al. | |
| 6,490,923 B1 | 12/2002 | Breng et al. | ................ 73/504.12 |
| 6,718,823 B2 | 4/2004 | Platt | |
| 6,978,673 B2 * | 12/2005 | Johnson et al. | ............ 73/504.12 |
| 7,043,987 B2 | 5/2006 | Jeong et al. | ................ 73/504.12 |
| 7,149,442 B2 | 12/2006 | Ushijima et al. | ................ 399/48 |
| 7,382,137 B2 | 6/2008 | Ushijima et al. | .............. 324/458 |

(Continued)

FOREIGN PATENT DOCUMENTS

CN    1530632 A    9/2004

(Continued)

OTHER PUBLICATIONS

PCT International Search Report and Written Opinion of the International Searching Authority, Mailing Date Mar. 7, 2008 in PCT/JP2007/065108.

(Continued)

*Primary Examiner* — John Chapman, Jr.
(74) *Attorney, Agent, or Firm* — Fitzpatrick, Cella, Harper & Scinto (57) ABSTRACT

Provided is an angular velocity sensor including: a reference vibrator supported so as to generate reciprocating rotational vibration about a first rotation axis as a center; a detection vibrator supported by the reference vibrator so as to generate reciprocating rotational vibration about a second rotation axis, which is different from the first rotation axis, as a center; a reference vibration generating unit for allowing the reference vibrator to generate reciprocating rotational vibration; and a detection unit for detecting a displacement amount of the detection vibrator with respect to the reference vibrator, which is in association with the reciprocating rotational vibration of the detection vibrator.

13 Claims, 8 Drawing Sheets

U.S. PATENT DOCUMENTS

| | | |
|---|---|---|
| 2002/0189351 A1 | 12/2002 | Reeds et al. |
| 2004/0231418 A1 | 11/2004 | Jeong et al. |
| 2008/0218172 A1 | 9/2008 | Ushijima et al. .............. 324/457 |
| 2008/0264167 A1 | 10/2008 | Kandori et al. ............ 73/504.12 |

FOREIGN PATENT DOCUMENTS

| | | |
|---|---|---|
| EP | 1455162 | 9/2004 |
| EP | 1677074 | 7/2006 |
| GB | 2198231 | 6/1988 |
| JP | 7-239339 | 9/1995 |
| JP | 10-89968 | 4/1998 |
| JP | 10-96633 | 4/1998 |
| JP | 11-142164 | 5/1999 |
| JP | 2002-519625 | 7/2002 |
| JP | 2004-271526 | 9/2004 |
| JP | 2006-119002 | 5/2006 |
| KR | 10-0503472 | 7/2005 |

OTHER PUBLICATIONS

Korean Office Action dated Sep. 28, 2011 in Korean Application No. 10-2009-7004843. (with English translation).

Chinese Office Action dated Aug. 3, 2011 issued in corresponding Chinese Patent Application No. 200780029453.5.

U.S. Appl. No. 12/371,530, filed Feb. 13, 2009, Inventor: Takagi, et al.

* cited by examiner

ANGULAR VELOCITY SENSOR

TECHNICAL FIELD

The present invention relates to a sensor for detecting an angular velocity.

BACKGROUND ART

Up to now, a vibration type angular velocity sensor using micro-electro-mechanical systems (MEMS) has been proposed. The vibration type angular velocity sensor employs a system in which a Coriolis force (also referred to as "deflecting force"; hereinafter, referred to as "Coriolis force") generated when an angular velocity, which is an object to be detected, is input to the sensor from an outside, is detected as a displacement of vibration of a vibrator, while the vibrator is allowed to generate reference vibration with a predetermined amplitude. A direction of the Coriolis force is determined by a direction of the reference vibration and by a direction of the angular velocity. Accordingly, it is necessary that the vibrator have a structure in which the vibrator can easily generate vibration in the direction of the reference vibration and also in the direction of the Coriolis force (detecting direction). For this reason, there has been proposed a so-called double frame system in which a vibrator for reference vibration (reference vibration) and a vibrator for detection (detection vibrator) are separately provided.

Japanese Patent No. 3,336,730 discloses a structure, as one mode of the angular velocity sensor of the double frame system, in which the detection vibrator is supported by the reference vibrator, and a detection unit for detecting a relative displacement between the reference vibrator and the detection vibrator is provided. Accordingly, such a problem is alleviated that a component of the vibration of the reference vibrator which is generated in the detecting direction is superimposed with a detection signal of the detection unit.

Further, U.S. Pat. No. 6,374,672 discloses a structure in which an inclination of the detection vibrator corresponding to the angular velocity is detected by allowing a doughnut-type reference vibrator, which supports the disc-like detection vibrator, to generate reciprocating rotational vibration. As a result, such a problem is alleviated that degradation of the accuracy of the detection signal which is caused by the vibration of the detection vibrator due to the vibration of the reference vibrator.

In the vibration type angular velocity sensor, a displacement amount of the detection vibrator for detecting the angular velocity is generally only about one of many hundreds to one of many thousands of a displacement amount of the reference vibration of the reference vibrator. For this reason, it is necessary to detect a small motion of the detection vibrator in a large motion of the reference vibrator. Accordingly, when a noise component (e.g., vibration caused in a direction different from the direction of the reference vibration) of the vibration is generated by the reference vibration, the noise component is detected by the detection unit. In a case where the angular velocity detection is performed with high accuracy, the noise component may be a major factor of degradation of the accuracy in detection of the angular velocity.

In general, the reference vibrator has asymmetric properties caused by an error of a processing accuracy in a manufacturing process, with respect to a structure of the reference vibrator, a structure of a member for supporting the reference vibrator, a drive force applied by a drive unit of the reference vibrator, and the like. For this reason, the reference vibrator generates vibration with a wobbling component in a direction other than a predetermined direction of the reference vibration. The same is applied to the angular velocity sensor of the double frame system.

Causes of the noise generated by the reference vibration can be roughly classified into the following two causes. That is: (1) vibration itself of the reference vibration is detected as a detection signal in error by the detection unit; (2) vibration of the detection vibrator excited by the reference vibration (for example, also when an angular velocity ω is not input) is detected as a detection signal in error by the detection unit.

Figure 7A:
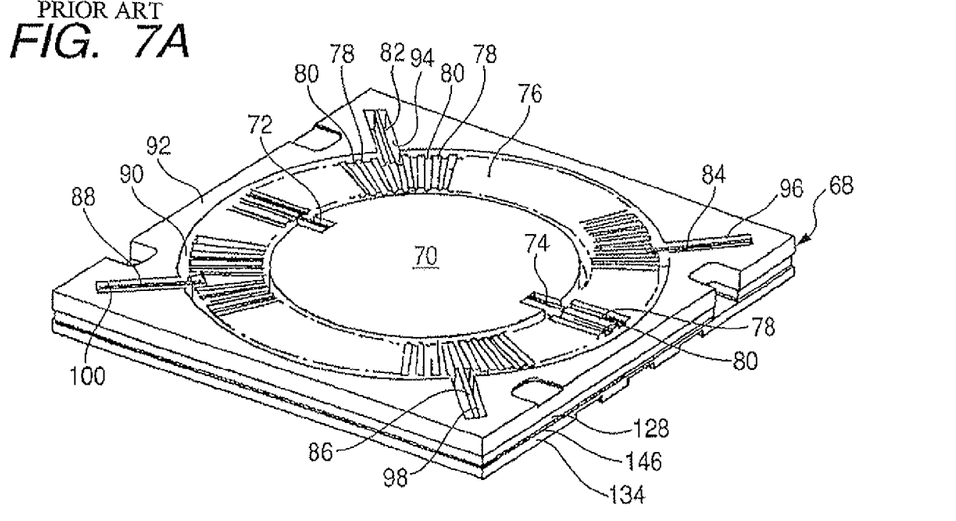
FIGS. 7A, 7B, and 7C are views for illustrating a conventional angular velocity sensor.
Figure 7B:
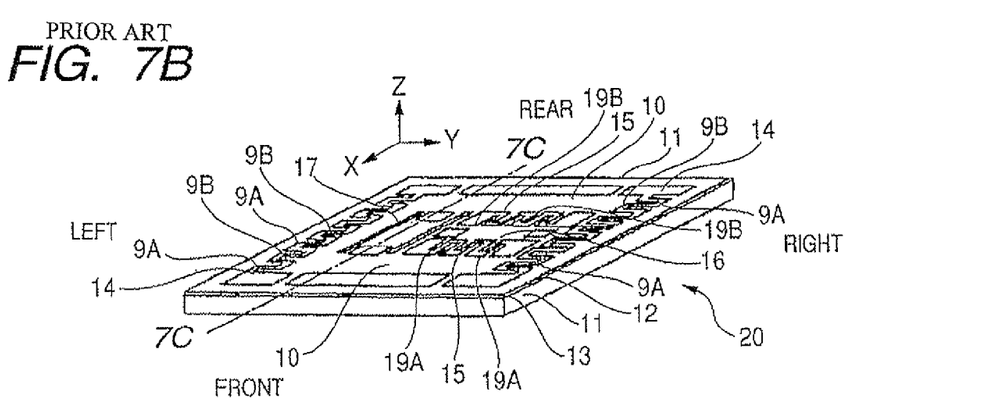
Figure 7C:
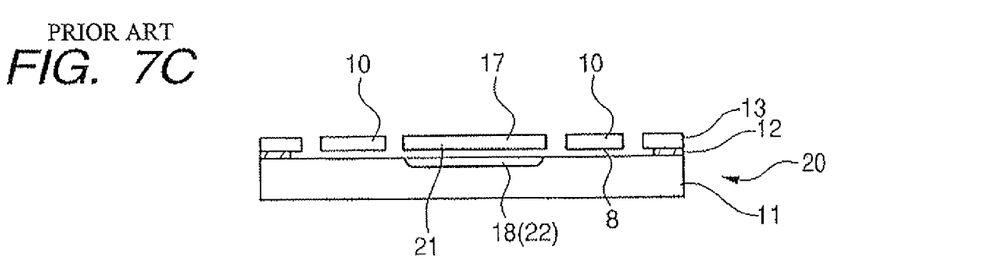

The above-mentioned causes are described with reference to the drawings with respect to the angular velocity sensor according to the above-mentioned cited references. In the angular velocity sensor disclosed in Japanese Patent No. 3,336,730, as illustrated in FIGS. 7B and 7C, a vibrating body 10 for reference and a vibrating body 16 for detection are separately provided, and the angular velocity is detected by a detection unit 15 based on a change of a relative position between the vibrating body 10 for reference and the vibrating body 16 for detection. Note that, FIG. 7C is a cross-sectional view taken along the line 7C-7C of FIG. 7B. In the structure, even when the vibrating body 10 for reference generates vibration in a direction (for example, an X-axis direction of FIG. 7B) different from a desired direction, the detection unit 15 detects the relative position between the vibrating body for reference and the vibrating body for detection. Accordingly, the noise is hardly generated in the detection signal. In other words, the noise due to the above-mentioned cause (1) can be reduced.

However, in order to detect the Coriolis force corresponding to the angular velocity, the vibrating body 16 for detection is supported by a structure in which the vibration toward the detecting direction (X-axis direction of FIG. 7B) is easily generated. Accordingly, when the reference vibration with a direction of linear reciprocating vibration in plane with the detecting direction has a component of the linear reciprocating vibration toward the detecting direction, small vibration (noise component of vibration) may be generated in the vibrating body for detection even in a case where the angular velocity is not input. As a result, in a case where the angular velocity is detected with high accuracy, the small noise generated in the detection signal by the above-mentioned cause (2) may degrade the detection accuracy.

The angular velocity sensor disclosed in U.S. Pat. No. 6,374,672, as illustrated in FIG. 7A, has a structure in which a reference vibrator 76 has a rotation axis perpendicular to a substrate 68, and a detection vibrator 70 has rotation axes 72 and 74 parallel to the substrate 68, thereby performing a reciprocating rotational motion about each of rotation axes as a center. In the structure, the reference vibrator and the detection vibrator perform the reciprocating rotational motion about the difference rotation axes. Accordingly, the vibration of the noise component of the detection vibrator 70 is hardly transmitted, thereby making it difficult to generate the vibration of the noise component of the detection vibrator 70. For this reason, as compared with the structure disclosed in Japanese Patent No. 3,336,730, an effect of the reference vibration on the detection vibrator can be reduced to a large extent. In other words, the noise due to the above-mentioned cause (2) can be reduced.

On the other hand, the detection unit detects an electrostatic capacity between a pair of semicircular detection electrodes (not shown), which are provided on a side of a substrate (bonded to the substrate 68) fixed to the both vibrators, and the detection vibrator 70 opposing to the pair of electrodes.

By the semicircular detection electrodes, a positional relationship between the fixed substrate and the detection vibrator 70 can be detected.

However, in a case where the reference vibrator 76 generates reciprocating rotational vibration deviating from the rotation axis, or in a case where the reference vibrator 76 has a motion component with inclination with respect to the fixed substrate, even when the detection vibrator 70 is not oscillated, a relationship between opposing areas of the reference vibrator 76 and the pair of semicircular detection electrodes is changed. For this reason, by the above-mentioned cause (1), the small noise may be generated in the detection signal. Thus, when the angular velocity is detected with high accuracy, the small noise due to the above-mentioned cause (1) may degrade the detection accuracy.

In addition, In the angular velocity sensor disclosed in U.S. Pat. No. 6,374,672, the rotation axes 72 and 74 are deviated by the reference vibration of the reference vibrator 76. Specifically, in a case of detecting the inclination corresponding to the angular velocity with respect to the fixed substrate of the reference vibrator 70, the rotation axis of the detection vibrator 70 is deviated from a parallel line which separates the pair of semicircular detection electrodes provided on the fixed substrate side. Accordingly, to be exact, the wobbling component of the reference vibrator 76 may be mixed in the inclination component of the detection vibrator 70 which is detected by the detection unit. This may become a cause of degradation of the detection accuracy in the case where the angular velocity is detected with high accuracy (one reason for the above-mentioned cause (1)).

DISCLOSURE OF THE INVENTION

In view of the above-mentioned problems, according to the present invention, there is provided an angular velocity sensor including: a reference vibrator supported so as to generate reciprocating rotational vibration about a first rotation axis as a center; a detection vibrator supported by the reference vibrator so as to generate reciprocating rotational vibration about a second rotation axis, which is different from the first rotation axis, as a center; a reference vibration generating unit for allowing the reference vibrator to generate reciprocating rotational vibration; and a detection unit for detecting a displacement amount of the detection vibrator with respect to the reference vibrator, which is in association with the reciprocating rotational vibration of the detection vibrator.

Further features of the present invention will become apparent from the following description of exemplary embodiments with reference to the attached drawings.

BEST MODES FOR CARRYING OUT THE INVENTION

An embodiment of the present invention will be described. An angular velocity sensor according to an embodiment of the present invention includes a reference vibrator, a detection vibrator, a reference vibration generating unit, and a detection unit that are described below. The reference vibrator is supported by a support substrate so as to generate reciprocating rotational vibration about a first rotation axis as a center. The detection vibrator is supported by the reference vibrator so as to generate reciprocating rotational vibration such that, for example, the detection vibrator rotates about a second rotation axis orthogonal to the first rotation axis, by a Coriolis force generated corresponding to reciprocating rotational vibration of the reference vibrator and an angular velocity input from an outside. The reference vibration generating unit allows the reference vibrator to generate reciprocating rotational vibration by, for example, an electrostatic force about the first rotation axis as a center. The detection unit detects a relative position between the reference vibrator and the detection vibrator by, for example, an electrostatic capacity therebetween, and detects the Coriolis force corresponding to a magnitude of the rotation of the detection vibrator about the second rotation axis as a center, thereby detecting the angular velocity.

The reference vibrator serving as a member for holding the detection vibrator is formed of, for example, silicon. The support substrate serving as a member for holding the reference vibrator from the outside of an outer edge thereof may be also formed of, for example, silicon.

A principle for solving the above-mentioned problems of the angular velocity sensor according to the present invention including this embodiment is described as follows. In order to provide the angular velocity sensor in which noise generated in a detection signal is reduced by the reference vibration, the inventors have focused on "(1) vibration directions of the reference vibrator and the detection vibrator" and "(2) the detection unit for detecting vibration of the detection vibrator". According to the present invention, it is assumed that "(1) vibration directions of the reference vibrator and the detection vibrator" are determined by reciprocating rotational vibration about each rotation axis thereof as a center, and "(2) the detection unit for detecting the vibration of the detection vibrator" is a unit for detecting the relative position between the reference vibrator and the detection vibrator. As a result, the vibrators each perform a reciprocating rotational motion about a different rotation axis, so a vibrational component of the reference vibrator is hardly transmitted to the detection vibrator, and thus the above-mentioned cause (2) can be overcome. In addition, in the detection unit for detecting the relative position between the reference vibrator and the detection vibrator, the detection unit is also displaced according to the wobbling component, so a reciprocating vibrational component or a vibrational wobbling component of the reference vibrator is hardly detected, and thus the above-mentioned cause (1) can be overcome.

Hereinafter, examples of the present invention will be described with reference to the drawings.

EXAMPLE 1

Figure 1A:
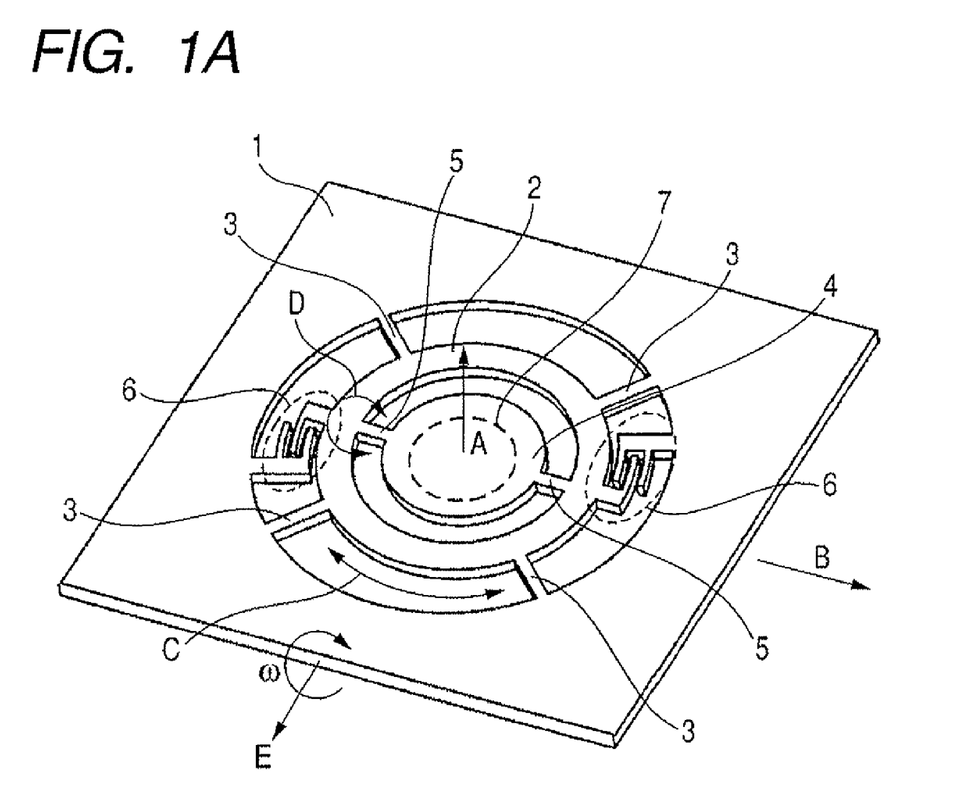
FIGS. 1A and 1B are exploded perspective views for illustrating an angular velocity sensor according to Example 1 of the present invention.
Figure 1B:
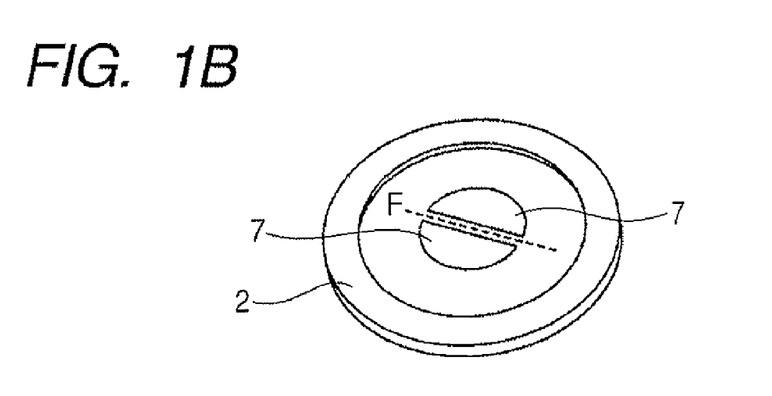

FIGS. 1A and 1B are exploded perspective views for illustrating an angular velocity sensor according to Example 1 of the present invention. As illustrated in FIGS. 1A and 1B, the angular velocity sensor includes a support substrate 1, a reference vibrator 2, a support member 3 for supporting the reference vibrator 2, a detection vibrator 4, a support member 5 for supporting the detection vibrator 4, a drive unit 6 (reference vibration generating unit) for driving the reference vibrator 2, and a detection unit 7 for detecting vibration of the detection vibrator 4.

In this example, as illustrated in FIGS. 1A and 1B, the angular velocity sensor includes the reference vibrator 2 formed of two separate members. The angular velocity sensor of this example can be produced by bonding the portion of the reference vibrator 2 illustrated in FIG. 1B to a lower portion of the reference vibrator 2 illustrated in FIG. 1A.

The annular reference vibrator 2 is supported by the substrate 1 with the support member 3 having four portions formed at equal angle intervals about a rotation axis A. The axis A is a first rotation axis which is perpendicular to the disc-like detection vibrator 4 when the detection vibrator is placed at a neutral position where no force is applied to the detection vibrator. The reference vibrator 2 can generate reciprocating rotational vibration in a direction indicated by an arrow C about the first rotation axis A as a center, while being supported by the support member 3.

The detection vibrator 4 is supported by the reference vibrator 2 with the support member 5 which has two portions extending along a predetermined straight line (axis B). The axis B is a second rotation axis which is in parallel with the substrate 1 and orthogonal to the axis A. The detection vibrator 3 has a structure capable of generating reciprocating rotational vibration in a direction indicated by an arrow D about the second rotation axis B as a center, while being supported by the support member 5 which serves as a spring.

The drive unit 6 allows the reference vibration 2 to generate reciprocating rotational vibration (reference vibration) toward the direction of the arrow C about the first rotation axis A as a center. During a detecting operation of the sensor, predetermined reference vibration is constantly generated. As a result, in a case where an angular velocity ω having an angular velocity component about an axis E, which is orthogonal to the axis A and the axis B, as a center, is input to the sensor, in the detection vibrator 4, the Coriolis force corresponding to the reference vibration and the magnitude of the angular velocity component of the angular velocity ω is generated in the direction of the arrow D. By the Coriolis force, the detection vibrator 4 generates reciprocating rotational vibration toward the direction of the arrow D about the second rotation axis B as a center.

The detection unit 7 detects the relative position between the reference vibrator 2 and the detection vibrator 4, thereby measuring the displacement of the vibration of the detection vibrator 4. From the magnitude of the vibration displacement thus measured, the magnitude of the angular velocity component about the axis E as a center is detected with respect to the input angular velocity ω. Specifically, the detection unit 7 is a unit for measuring an electrostatic capacity between the detection electrode 7 having two separate portions provided on a portion of the reference vibrator 2 illustrated in FIG. 1B, and the detection electrode 7 (indicated by the broken line in FIG. 1A) provided on a back surface of the detection vibrator 4. The detection electrode 7 has a flat-plate portion which is to be positioned on the reference vibrator 2, so the detection electrode 7 can be easily formed. A plane corresponding to the portion of the reference vibrator 2 on which the detection electrodes 7 of FIG. 1B are formed, is in parallel with a plane corresponding to the detection vibrator 4 on which the detection electrode 7 is formed, with a certain gap, when the angular velocity ω is not input. In this case, when the annular peripheral portion corresponding to the portion of the reference vibrator 2 illustrated in FIG. 1B becomes higher than the central portion and serves as a spacer, thereby obtaining the gap. The detection electrode 7 provided on the reference vibrator 2 illustrated in FIG. 1B is disposed on the plane corresponding to the portion of the reference vibrator 2 opposing to the detection vibrator 4, and is separated in two with a semicircular shape by the straight line P which is in parallel with the axis B.

An operation of the angular velocity sensor according to this example will be described. Here, considered is a case where the reference vibration is generated in a reciprocating rotational vibration direction C about the first rotation axis A as a center. The detection vibrator 4 is supported by the reference vibrator 2 with the support member 5, so reciprocating rotational vibration in the direction indicated by the arrow D about the second rotation axis B as a center is most liable to be generated, and vibration in the other directions is not hardly generated. For this reason, the detection vibrator 4 generates reciprocating rotational vibration in the direction C about the first axis A as a center, along with the motion of the reference vibrator 2. Accordingly, the relative relationship between the detection vibrator 4 and the reference vibrator 2 is not changed. Similarly, the positional relationship between the second rotation axis B and the central line F of the detection electrode 7 is also fixed, which maintains a parallel relationship therebetween.

In this state, a case where the angular velocity ω is input to the sensor is considered. According to the generated Coriolis force, about the second rotation axis B as a center, the detection vibrator 4 generates reciprocating rotational vibration in the direction of the arrow D. Here, the rotation axis A and the rotation axis B are orthogonal to each other, so the vibration due to the Coriolis force is generated more efficiently about the rotation axis B. In this case, the positional relationship between the rotation axis B and the central line F of the detection electrode 7 is fixed, so the change in electrostatic capacity between the detection electrode 7 formed on the portion of the reference vibrator 2 and the detection electrode 7 formed on the detection vibrator 4 can be represented as a function of only an angle of inclination of the detection vibrator 4 about the second rotation axis B as a center. Specifically, the detection unit 7 can detect, with accuracy, the magnitude of the reciprocating rotational vibration in the direction of the arrow D which is generated by the detection vibrator 4 about the second rotation axis as a center, without being affected by the reference vibration. In other words, a displacement amount of the detection vibrator with respect to the reference vibrator can be obtained. As a result, the Coriolis force and the angular velocity can be detected with high accuracy, thereby realizing an angular velocity sensor capable of detecting the angular velocity with high accuracy.

Further, the magnitude of the generated Coriolis force corresponds to the magnitude of the reference vibration. Here, even when the magnitude of the reference vibration is increased so as to generate a larger Coriolis force for the purpose of increasing the sensitivity, the positional relationship between the axis B and the central line F of the detection electrode 7 is not changed. Accordingly, it is possible to provide a sensor capable of obtaining higher sensitivity with respect to the angular velocity ω and detecting the angular velocity with higher accuracy.

In a structure other than the structure according to this example, when the reference vibration is generated, the positional relationship between the rotation axis B and the central line F of the detection electrode 7 is changed. In other words, when the magnitude of the reference vibration is increased so as to generate a larger Coriolis force, the positional relationship between the axis B and the central line F of the detection electrode 7 is correspondingly changed. As a result, an effect, in which the detection vibration becomes larger according to the magnitude of the reference vibration, hardly leads to the improvement of the detection accuracy. This may raise a problem particularly when the angular velocity is intended to be detected with high accuracy.

Next, considered is a case where the angular velocity ω is not input to the sensor, the reference vibrator 2 generates reference vibration toward the reciprocating rotational vibration direction about the first rotation axis A as a center, and the vibration wobble (noise component of vibration) is contained in the reference vibration.

In this example, the detection vibrator 4 has a structure in which the detection vibrator 4 is supported so as to be capable of performing the reciprocating rotational motion, and hardly generates vibration in a direction other than the reciprocating rotational vibration direction about the second rotation axis B as a center. As a result, in a case where few components in the rotational direction about the second rotation axis B as a center are contained in the vibrational wobbling component of the reference vibrator 2, the positional relationship between the reference vibrator 2 and the detection vibrator 4 is not substantially changed (the relative position is maintained). In this case, the reference vibrator 2 is supported from the peripheral portion by four supporting members 3, which realizes a structure in which the vibration toward the rotational direction about the second rotation axis B as a center is hardly generated.

Accordingly, the detection unit 7 detects the positional relationship between the reference vibrator 2 and the detection vibrator 4, so the vibration wobble of the reference vibrator 2 is not detected as a signal. As a result, it is possible to obtain the displacement amount of the detection vibrator with respect to the reference vibrator. In other words, it is possible to provide an angular velocity sensor in which the accuracy of the detection signal is hardly degraded even when the wobbling component of the reference vibrator 2 is present.

Further, in this example, as illustrated in FIGS. 1A and 1B, the reference vibrator 2 is held by the support member 3 from the peripheral portion thereof, thereby making it extremely difficult for the reference vibrator 2 to cause the vibration wobble in the rotational direction about the second rotation axis B as a center. Accordingly, it is possible to provide an angular velocity sensor in which the accuracy of the detection signal is hardly degraded.

In addition, by employment of the structure of this example, it is possible to dispose the detection electrode 7 of the detection unit without taking into consideration of the interference due to the vibration wobble of the reference vibration with respect to the vertical direction of the substrate 1. In a structure other than the structure of this example, in order to avoid a mechanical interference due to the vibration wobble caused in the vertical direction, it is necessary to make a distance between the reference vibrator and the detection electrode, and the sensitivity of the detection signal with respect to the angular velocity to be input is easily degraded.

In other words, as described above, in the structure of this example, even when the vibration wobble is caused in the reference vibration, the relative positional relationship between the detection vibrator 4 and the reference vibrator 2 is not changed. As a result, it is possible to obtain the displacement amount of the detection vibrator with respect to the reference vibrator. Accordingly, it is possible to provide the detection electrode 7 disposed on the portion of the reference vibrator 2, and the detection electrode 7 disposed on the detection vibrator 4, with a small distance therebetween. Therefore, it is possible to take an extremely large value of the electrostatic capacity used for detection by the detection unit 7, and obtain an extremely large detection signal. Thus, it is possible to detect the angular velocity ω with extremely high sensitivity. In other words, assuming that the noise is constant, a large signal can be detected at the same angular velocity, so it is possible to provide an angular velocity sensor with high accuracy.

As described above, by employment of this example, it is possible to realize a sensor capable of reducing the noise generated in the detection signal by the reference vibration, and detecting the angular velocity with high accuracy.

EXAMPLE 2

Figure 2A:
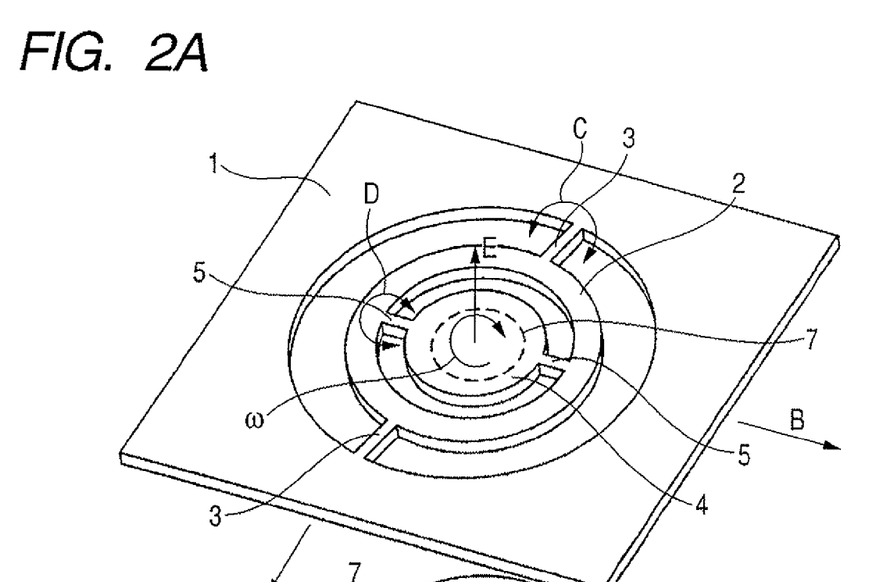
FIGS. 2A, 2B, and 2C are exploded perspective views for illustrating an angular velocity sensor according to Example 2 of the present invention.
Figures 2B, 2C:
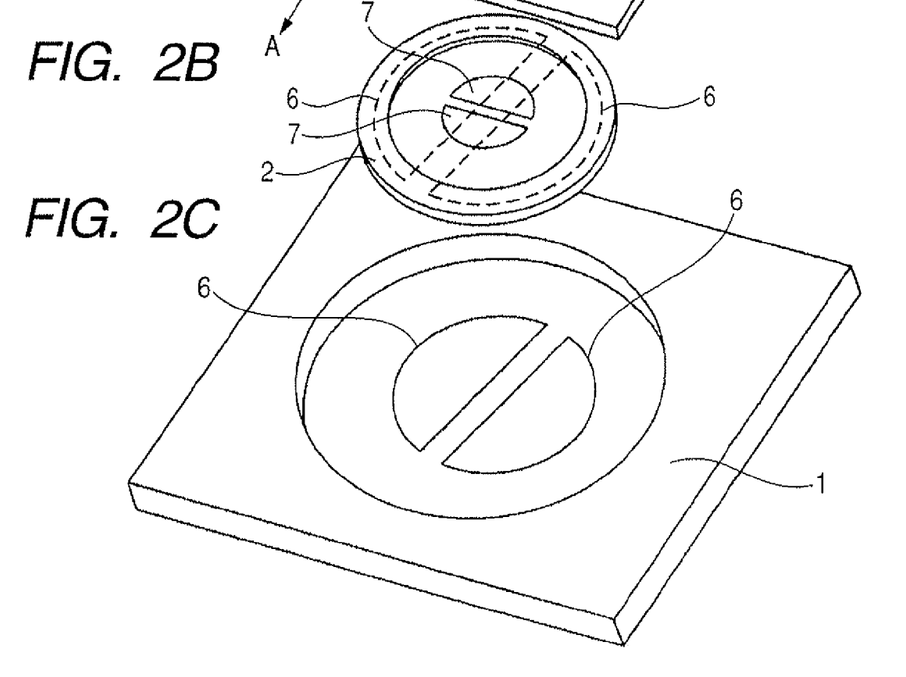

FIGS. 2A, 2B, and 2C are exploded perspective views for illustrating an angular velocity sensor according to Example 2 of the present invention. In this example, the direction (direction of the first rotation axis A) in which the reference vibration is generated is different from that of Example 1. Example 2 is similar to Example 1 except for that point.

As illustrated in FIGS. 2A, 2B, and 2C, the angular velocity sensor includes the support substrate 1, the reference vibrator 2, the support member 3 for supporting the reference vibrator 2, the detection vibrator 4, the support member 5 for supporting the detection vibrator 4, the drive unit 6 for driving the reference vibrator 2, and the detection unit 7 for detecting vibration of the detection vibrator 4.

Also in this example, as illustrated in FIGS. 2A and 2B, the reference vibrator 2 includes two separate members. The structure can be obtained by bonding the portion of the reference vibrator 2 illustrated in FIG. 2B to a lower portion of the reference vibrator 2 illustrated in FIG. 2A, and by further bonding the support substrate 1 of FIG. 2C to a lower portion of the bonded support substrate 1.

About the axis A, which is in parallel with the disc-like detection vibrator 4, as a center, the reference vibrator 2 generates reciprocating rotational vibration in the direction of the arrow C. The drive unit 6 allows the reference vibrator 2 to generate reciprocating rotational vibration, as reference vibration, in the direction of the arrow C about the first axis A as a center. Specifically, on a lower surface of the reference vibrator 2 of FIG. 2B, there is formed the semicircular drive electrode 6 (indicated by broken lines) which is separated into two by the straight line in parallel with the rotation axis A. In addition, on the support substrate 1 of FIG. 2C, the semicircular drive electrode 6 which is separated into two by the straight line in parallel with the rotation axis A is formed in the same manner. Electrostatic attraction is generated between those drive electrodes 6, thereby constituting the drive unit 6.

In this example, in a case where the angular velocity ω is input to the sensor about the axis E as a center, the Coriolis force corresponding to the reference vibration and the magnitude of the angular velocity ω is generated in the direction of the arrow D. Due to the Coriolis force, the reciprocating rotational vibration of the detection vibrator 4 is generated toward the direction of the arrow D about the second rotation axis B as a center. The principle of the detection by the detection unit 7 is as described in Example 1.

By employment of this example, it is possible to realize a sensor for detecting the angular velocity about the axis E perpendicular to the flat-plate type detection vibrator 4 with high accuracy.

EXAMPLE 3

Figure 3A:
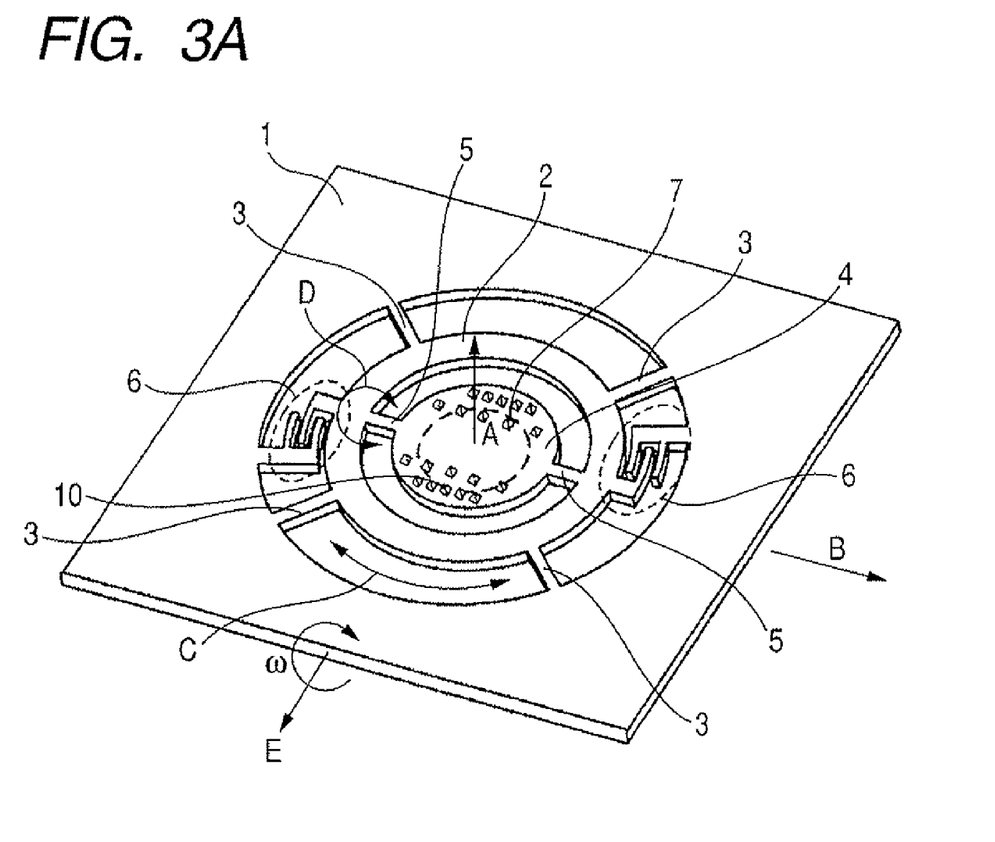
FIGS. 3A and 3B are exploded perspective views for illustrating an angular velocity sensor according to Example 3 of the present invention.
Figure 3B:
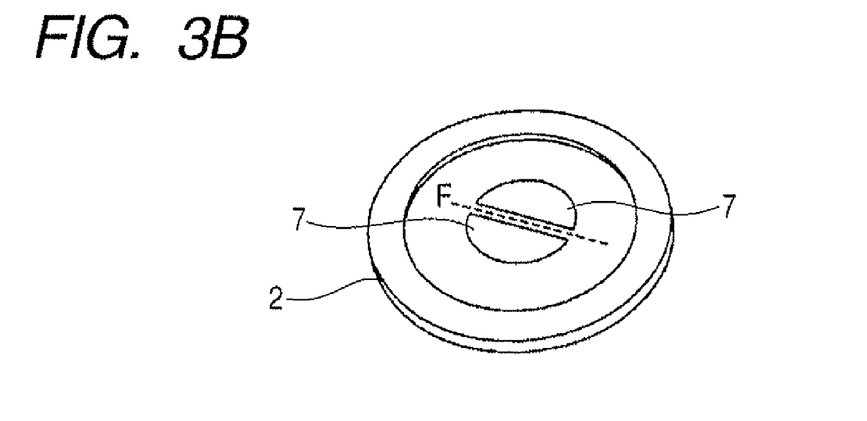

FIGS. 3A and 3B are exploded perspective views for illustrating an angular velocity sensor according to Example 3 of the present invention. Example 3 is different from Example 1 in that the detection vibrator 4 has recessed portions or through-holes. Example 3 is similar to Example 1 except for that point.

Also with regard to the angular velocity sensor employing this example, there is no necessity of taking into consideration of the interference due to the vibration wobble of the reference vibrator 2. Accordingly, it is possible to dispose the portion of the reference vibrator 2 of FIG. 3B and the detection vibrator 4 with a small distance therebetween. As a result, in a case where a system for electrostatic capacity detection is used for the detection unit 7, the detection sensitivity obtained when the same angular velocity ω is input to the sensor can be improved to a large extent.

However, when the gap between the reference vibrator 2 and the detection vibrator 4 becomes smaller, there arises a problem of air damping which inhibits the vibration motion by an influence of the air in the gap. As a result, a force for inhibiting the vibration motion of the detection vibrator 4 for detecting the Coriolis force is generated, which reduces the vibration itself for detection by the Coriolis force. Accordingly, depending on the size of the gap or the shape of the vibrator, while the sensitivity for detecting the electrostatic capacity is increased by disposing the reference vibrator 2 and the detection vibrator 4 with a small distance therebetween, the detection sensitivity is degraded by the influence of the air damping, which may lead to degradation of the entire sensitivity. This example includes a structure obtained by taking that point into consideration.

As illustrated in FIGS. 3A and 3B, the angular velocity sensor includes the support substrate 1, the reference vibrator 2, the support member 3 for supporting the reference vibrator 2, the detection vibrator 4, the support member 5 for supporting the detection vibrator 4, the drive unit 6 for driving the reference vibrator 2, and the detection unit 7 for detecting vibration of the detection vibrator 4. The angular velocity sensor according to this example can also be produced by bonding the portion of the reference vibrator 2 illustrated in FIG. 3B to a lower portion of the reference vibrator 2 illustrated in FIG. 3A.

The detection vibrator 4 according to this example has a plurality of through-holes 10 formed therein. As the detection vibrator 4 is more distant from the second rotation axis B, the through-holes 10 are provided with higher density.

Here, considered is the vibration of the detection vibrator 4 for detecting the Coriolis force. When the Coriolis force corresponding to the angular velocity, which is an input from an outside, is generated, the detection vibrator 4 generates reciprocating rotational vibration about the second rotation axis B as a center. Here, a point closer to the rotation axis B is represented as U1, and a point distant from the rotation axis B is represented as U2. In this case, the detection vibrator 4 generates a larger displacement at the point U2 which is distant from the rotation axis B than at the point U1 which is closer to the rotation axis B. In other words, in a case where the detection vibrator 4 performs the reciprocating rotational motion, the point U2 is more affected by the air damping caused between the detection vibrator 4 and the portion of the reference vibrator 2 of FIG. 3B. On the contrary, the point U1 which is closer to the rotation axis B is less affected by the air damping because the displacement at the point U1 does not become too large even when the detection vibrator 4 generates vibration to a large extent.

In a case where the through-holes 10 are uniformly formed in the detection vibrator 4, the air damping is uniformly reduced, which makes it easy for the detection vibrator 4 to perform a vertical motion in the axial direction of the first rotation axis A. On the other hand, this example has a structure in which the effect of the air damping becomes relatively large in the central portion of the detection vibrator 4, so the vibration of the detection vibrator 4 in the vertical direction is hardly generated.

Thus, in the structure of this example, the air damping is more reduced by the through-holes 10 at positions apart from the rotation axis B. In other words, this example has a structure in which the air damping can be reduced particularly in an area (area with large displacement) which is liable to be affected by the air damping (vibration state is changed due to the air resistance) when the detection vibrator 4 generates reciprocating rotational vibration about the second rotation axis B as a center.

As described above, according to this example, it is possible to distribute the effect of the air damping so that the detection vibrator 4 easily generate reciprocating rotational vibration about the second rotation axis B as a center and hardly perform the vertical motion. For this reason, the detection vibrator 4 can easily generate desired reciprocating rotational vibration, and hardly generates vibrations other than the desired one. Accordingly, it is possible to provide an angular velocity sensor which is high in detection sensitivity and low in noise.

On the other hand, by providing the through-holes 10, a surface area of the detection electrode 7 becomes smaller, so it is expected that the detection sensitivity is slightly degraded. However, if each size of the through-holes 10 is minute, a reduction rate of the detection sensitivity is smaller than a reduction rate of the surface area. Further, depending on the size of the through-holes 10, a degree of the influence of the air damping may be changed. To deal with this, in consideration of the detection sensitivity and the degree of the influence of the air damping, a size and shape of the through-holes 10 may be optimized.

In the above-mentioned example, the through-holes 10 are provided in the detection vibrator 4, but may be provided in other areas. The through-holes 10 may be provided in the area of the portion of the reference vibrator 2 opposing to the detection vibrator 4. The detection sensitivity of the angular velocity ω can be increased as a weight of the detection vibrator 4 becomes larger. As a result, by forming the through-holes 10 in the reference vibrator 2, it is possible to detect the angular velocity ω without reducing the weight of the detection vibrator 4, that is, without degrading the detection sensitivity.

Further, in both of the mode in which the through-holes 10 are provided in the area of the detection vibrator 4 and the mode in which the through-holes 10 are provided in the area of the reference vibrator 2 opposing to the detection vibrator 4, it is desirable to apply a potential for measurement to the vibrator which is provided with the through-holes 10 and is not provided with the detection electrode 7. As a result, the potential to be applied is increased by the amount of the sensitivity reduced by providing the through-holes 10, thereby enabling distribution of the influence of the air damping while the detection sensitivity at the detection electrode 7 is maintained. Accordingly, it is possible to detect the angular velocity with high accuracy.

In addition, the through-holes 10 may be provided in both the area of the detection vibrator 4 and the area of the reference vibrator 2 opposing to the detection vibrator 4. As a result, the influence of the air damping can be reduced to a large extent, and the detection vibrator 4 can more easily generate reciprocating rotational vibration. Accordingly, it is possible to detect the angular velocity with high accuracy.

Further, in the case where the through-holes 10 are provided in both the area of the detection vibrator 4 and the area of the reference vibrator 2 opposing to the detection vibrator 4, it is desirable to provide the through-holes 10 such that the through-holes 10 of each of the vibrators are not overlapped with each other. As a result, it is possible to distribute the influence of the air damping without largely degrading the detection sensitivity. Accordingly, it is possible to detect the angular velocity with high accuracy.

Further, in the above-mentioned example, the through-holes 10 are provided in the detection vibrator 4 or in the reference vibrator 2, the influence of the air damping can be reduced also by the use of the recessed portions instead of the through-holes 10. As a result, the recessed portions are more easily produced than the through-holes. A plurality of recessed portions may be separated from each others but if a groove is used to laterally connect the recessed portions and has open ends, the effect of the air damping can be reduced more effectively.

EXAMPLE 4

Figure 4A:
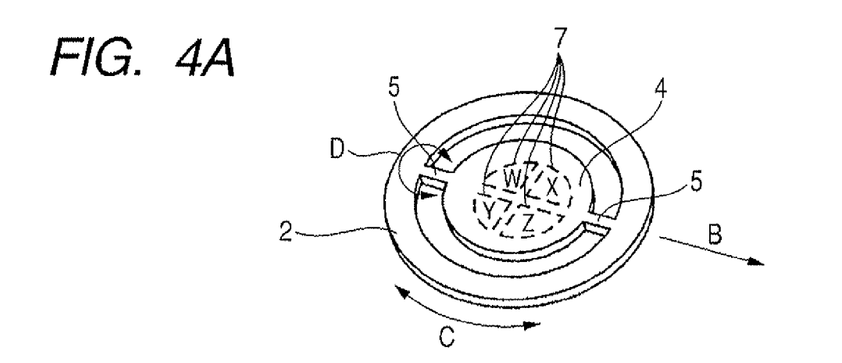
FIGS. 4A, 4B, and 4C are exploded perspective views for illustrating an angular velocity sensor according to Example 4 of the present invention.
Figure 4B:
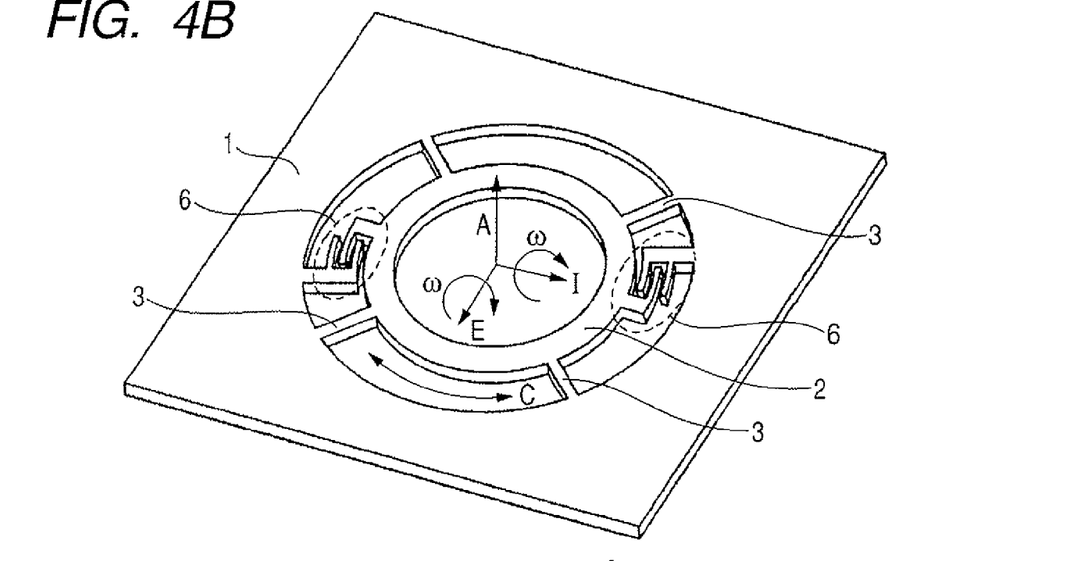
Figure 4C:
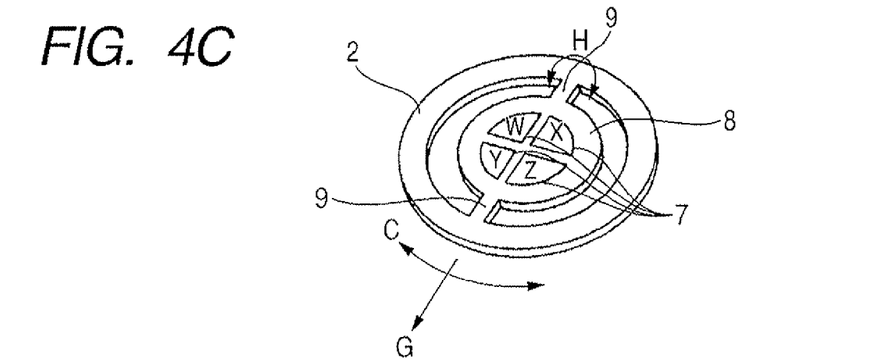

FIGS. 4A, 4B, and 4C are exploded perspective views for illustrating an angular velocity sensor according to Example 4 of the present invention. Example 4 is different from Example 1 in that a plurality of detection vibrators are provided and rotation axes are orthogonal to each other. In association with this, the reference vibrator includes three annular portions, and the detection electrode of the detection unit is not provided to the reference vibrator. Example 4 is similar to Example 1 except for that point.

As illustrated in FIGS. 4A, 4B, and 4C, the angular velocity sensor includes the support substrate 1, the reference vibrator 2, the support member 3 for supporting the reference vibrator 2, the detection vibrator 4, the support member 5 for supporting the detection vibrator 4, the drive unit 6 for driving the reference vibrator 2, a second detection vibrator 8, a support member 9 for supporting the second detection vibrator 8, and the detection unit 7 for detecting vibration of the detection vibrator 4 and the second detection vibrator 8.

In this example, as illustrated in FIGS. 4A, 4B, and 4C, the reference vibrator 2 includes three separate members. The angular velocity sensor according to this example can be produced by bonding the portion of the reference vibrator 2 illustrated in FIG. 4A to an upper portion of the reference vibrator 2 illustrated in FIG. 4B, and by further bonding the portion of the reference vibrator 2 illustrated in FIG. 4C to a lower portion of the reference vibrator 2 illustrated in FIG. 4B.

Further, in this example, the second detection vibrator 8 and the detection vibrator 4 are stacked in the direction of the first rotation axis A. The second detection vibrator 8 performs the reciprocating rotational motion in a direction indicated by an arrow H about a third axis G, which is perpendicular to the axis A and the axis B, as a center. When the angular velocity ω about the axis I, which is in parallel with the axis B, is input, by the generated Coriolis force, the second detection vibrator 8 performs the reciprocating rotational motion about the third rotation axis G as a center. The reciprocating rotational motion of the first detection vibrator 4 is as described in Example 1. Specifically, the axis E indicates a central axis of the angular velocity to be detected by the detection vibrator 4.

The detection unit 7 includes the detection electrode on each of the detection vibrator 4 and the second detection vibrator 8. The detection electrode has a shape obtained by equally dividing a circle by straight lines in parallel with the rotation axis B and the rotation axis G (detection electrodes W, X, Y, and Z). The detection electrodes X, Y, Z, and W opposing to each other form, in pairs, an electrostatic capacity. Accordingly, the detection unit 7 can detect the electrostatic capacity of each of the detection electrodes X, Y, Z, and W. By employment of the shape of the detection electrode, it is possible to detect the reciprocating rotational motion of the detection vibrator 4 about the second rotation axis B as a center, and the reciprocating rotational motion of the second detection vibrator 8 about the third rotation axis G as a center, at the same time. Specifically, by calculating a difference between a value obtained by adding the electrostatic capacity of the detection electrodes W and X, and a value obtained by adding the electrostatic capacity of the detection electrodes Y and Z, it is possible to detect the reciprocating rotational motion of the detection vibrator 4 about the second rotation axis B as a center. In addition, by calculating a difference between a value obtained by adding the electrostatic capacity of the detection electrodes W and Y, and a value obtained by adding the electrostatic capacity of the detection electrodes X and Z, it is possible to detect the reciprocating rotational motion of the second detection vibrator 8 about the third rotation axis G as a center. Further, it is possible to obtain the displacement amount of the detection vibrator with respect to the reference vibrator from the reciprocating rotational motion thus detected. As a result, the detection principle is the same as that of Example 1 in which the detection electrode is provided to the portion of the reference vibrator 2.

According to this example, it is possible to detect a biaxial angular velocity with the same chip area as that in the structure illustrated in FIG. 1A and 1B. Accordingly, it is possible to provide a small sensor capable of detecting the biaxial angular velocity with high accuracy.

In addition, unlike the structure illustrated in FIGS. 1A and 1B, in the structure of this example, the reference vibrator 2 and the detection unit 8 do not surround the detection vibrator. Accordingly, it is possible to reduce the effect in which the reciprocating rotational motion of the detection vibrator is inhibited by the air damping.

Further, this example has a symmetric structure (FIG. 1B is a central surface of the symmetric structure) with respect to the direction of the axis A, so generation of the vibration wobble itself of the reference vibrator can be reduced. Accordingly, it is possible to detect the angular velocity with higher accuracy.

As in Example 3, the detection vibrator 4 or the second detection vibrator 8 according to this example may be provided with recessed portions or through-holes in the following manner. That is, the through-holes are provided in the detection vibrator 4 with a density in proportion to a distance from the second rotation axis B. Further, the through-holes are provided in the second detection vibrator 8 with a density in proportion to a distance from the third rotation axis G. With that structure, it is possible to reduce the influence of the air damping on the vibration so that the detection vibrator 4 and the second detection vibrator 8 can easily perform the reciprocating rotational motion in a desired direction.

In addition, the through-holes provided in the detection vibrator 4 and the through-holes provided in the second detection vibrator 8 are arranged so as not to be overlapped with each other. As a result, it is possible to reduce the influence of the air damping on the vibration without largely degrading the detection sensitivity of the detection electrode.

With the above-mentioned structure, it is possible to realize an angular velocity sensor which is reduced in size, capable of detecting the biaxial angular velocity with high sensitivity, capable of reducing the degradation of the detection sensitivity due to the air damping, easily generates the vibration in the detecting direction, and has high sensitivity.

EXAMPLE 5

Figure 5A:
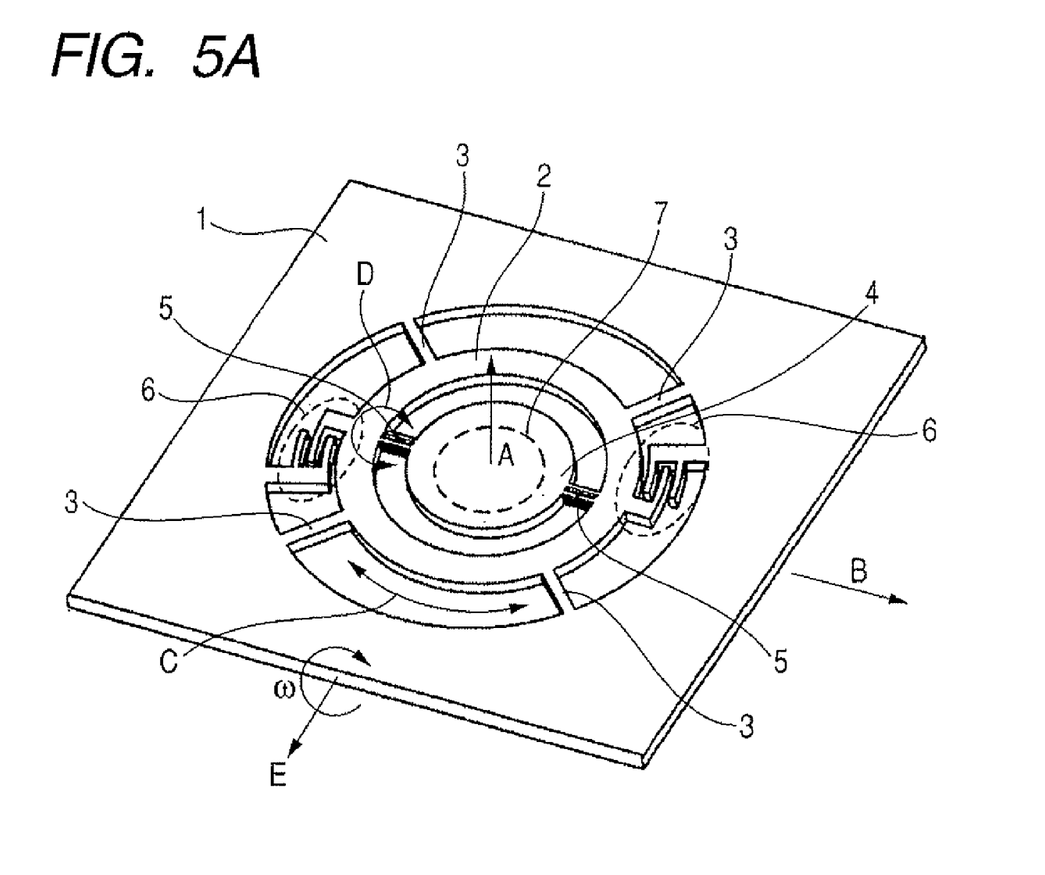
FIGS. 5A and 5B are exploded perspective views for illustrating an angular velocity sensor according to Example 5 of the present invention.
Figure 5B:
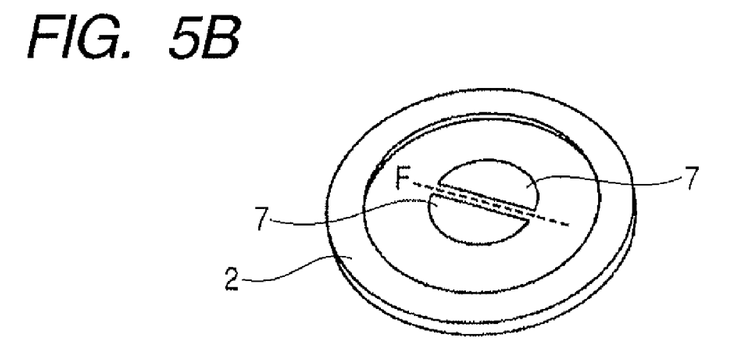

FIGS. 5A and 5B are exploded perspective views for illustrating an angular velocity sensor according to Example 5 of the present invention. Example 5 is different from Example 1 in that a cross-section of the support member 5 of the detection vibrator 4 has an X-shape. Example 5 is similar to Example 1 except for that point.

Figure 6:
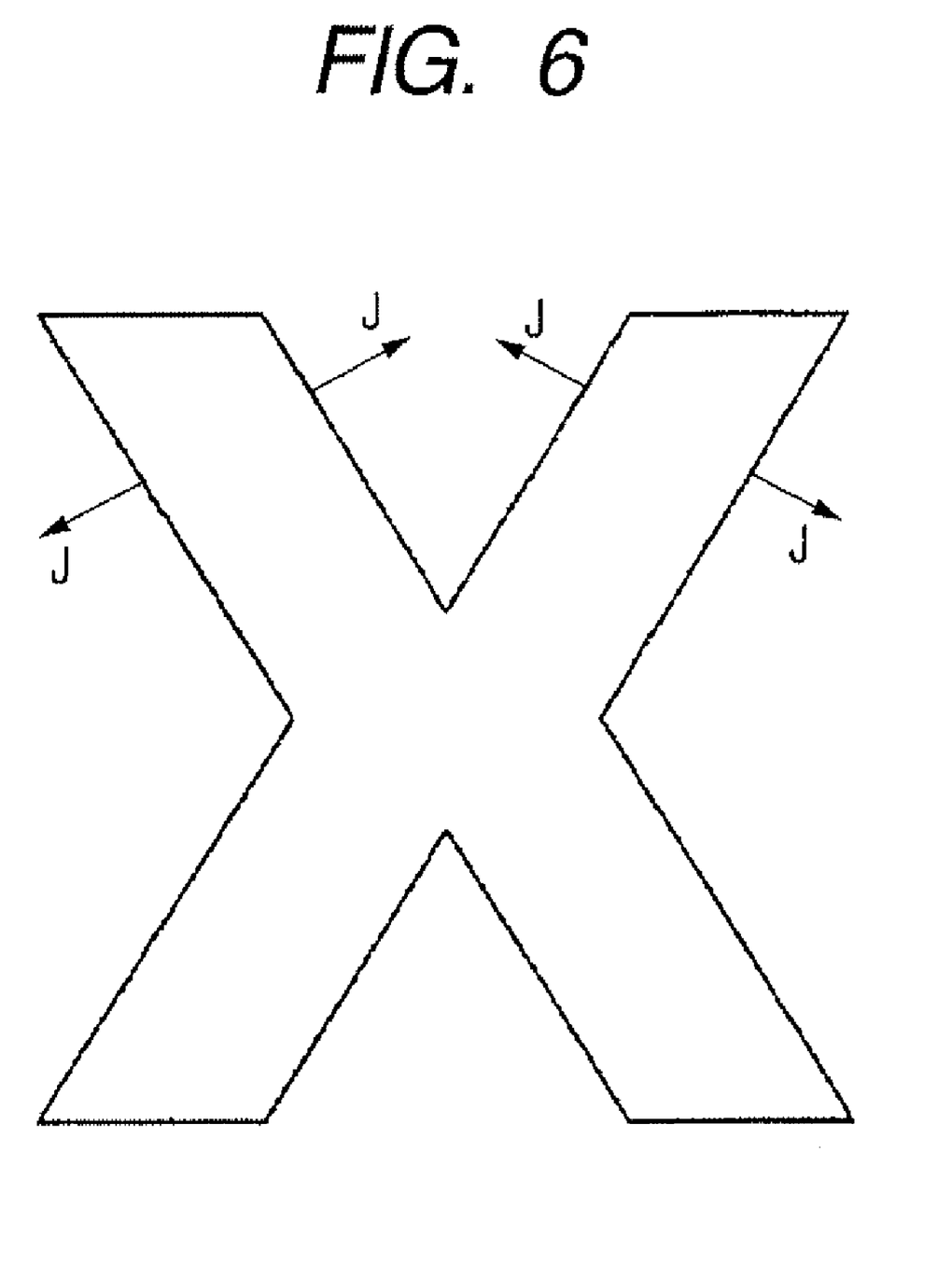
FIG. 6 is a cross-sectional view for illustrating a cross-section of a support member of a detection vibrator according to Example 5 of the present invention.

FIGS. 5A and 5B are similar to FIG. 1 except for the shape of a cross-section of the support member 5 of the detection vibrator 4. FIG. 6 is a diagram illustrating the shape of the cross-section of the support member 5 of the detection vibrator 4. The cross-section of the support member 5 of the detection vibrator 4 has the X-shape, and mechanical characteristics thereof are equivalent to those of a structure obtained by combining multiple plate-shape springs. In FIG. 6, directions in which each plate-shape spring is most liable to be deflected are indicated by arrows J. The plate-shape springs are arranged such that the arrows J cross to each other.

When the detection vibrator 4 performs the reciprocating rotational motion about the second rotation axis B as a center, deflection in the directions of the arrows J is circumferentially generated about the second rotation axis B as a center. In other words, in the reciprocating rotational motion about the second rotation B as a center, only the deflection in the directions in which the support member 5 is most liable to be deflected is generated. As a result, the detection vibrator 4 easily generates the reciprocating rotational motion about the second rotation axis B as a center.

On the other hand, when the detection vibrator 4 is to be moved in a direction other than the direction of the reciprocating rotational motion about the second rotation axis B as a center, since the arrows J cross each other, each plate-shape spring inhibits the deflection of another plate-shape spring. In other words, it is extremely difficult for the detection vibrator 4 to generate the vibration in the direction other than the direction of the reciprocating rotational motion about the second rotation axis B as a center.

By the use of this example, the support member 5 has the X-shape in the cross-section, so the detection vibrator 4 easily generates reciprocating rotational vibration about the second rotation axis B as a center. Accordingly, it is possible to reduce the vibration in the other directions. As a result, the magnitude of the detection vibration of the detection vibrator 4 per unit angular velocity is increased, and the sensitivity of the detection for the angular velocity is improved. In addition, the vibration of the detection vibrator 4 other than the reference vibration and the detection vibration due to the vibration wobble is hardly generated, so the detection noise generated by the vibrator can be reduced.

As described above, according to this example, it is possible to realize the angular velocity sensor which is high in detection sensitivity and low in noise.

OTHER EXAMPLES

It is possible to obtain a shape of the angular velocity sensor according to the present invention by the use of the MEMS. For example, a plurality of substrates are processed by the use of the MEMS, and the substrates are bonded to each other, thereby achieving the structure of the angular velocity sensor. Silicon often used for the MEMS is superior to metal in normal mechanical characteristics. In addition, it is possible to easily obtain a microstructure and a minute gap. Accordingly, it is possible to obtain larger reference vibration with an extremely large Q value, so there is a possibility to realize an angular velocity sensor having high sensitivity.

On the other hand, a difference between physical properties due to crystal orientations of silicon may affect the mechanical characteristics. The accuracy of processing of a thick three-dimensional structure using the MEMS is apt to be lower than that of general mechanical processing. Accordingly, in the angular velocity sensor using the MEMS, a wobble due to the reference vibration is easily generated.

By applying the present invention to the angular velocity sensor using the MEMS, even when the wobble due to the reference vibration is generated, the noise caused by the wobble can be reduced. Accordingly, it is possible to realize an angular velocity sensor which is low in noise caused by the wobble due to the reference vibration and with high accuracy, by the use of silicon or the like, while maintaining the characteristic of the high sensitivity. In addition, when a detecting technique using the electrostatic capacity is applied to detection unit 7, there is no need to consider the mechanical interference due to the vibration wobble, so it is possible to provide the electrodes with a small distance therebetween and provide a small gap by the use of the MEMS. Accordingly, it is possible to provide an angular velocity sensor having higher sensitivity and higher accuracy.

As described above, the present invention can solve the problems of the angular velocity sensor using the MEMS, and can provide an angular velocity sensor with higher accuracy. In addition, the object to be detected by the detection unit according to the present invention is the displacement amount of the detection vibrator with respect to the reference vibrator.

In the above-mentioned examples, the electrostatic attraction generated between the flat-plate electrodes (see FIGS. 2A, 2B, and 2C) or between the interdigital electrodes (for example, see FIGS. 1A and 1B) is used as the drive unit 6, but the drive unit 6 is not limited thereto. Any drive unit can be used as long as it can allow the reference vibrator 2 to generate reference vibration in a desired direction.

Further, in many of the above-mentioned examples, the semicircular detection electrode of the detection unit 7 is provided on the reference vibrator, but the structure is not limited thereto. The detection electrode may be provided on the detection vibrator 4 (or on the second detection vibrator 8).

Figure 8A:
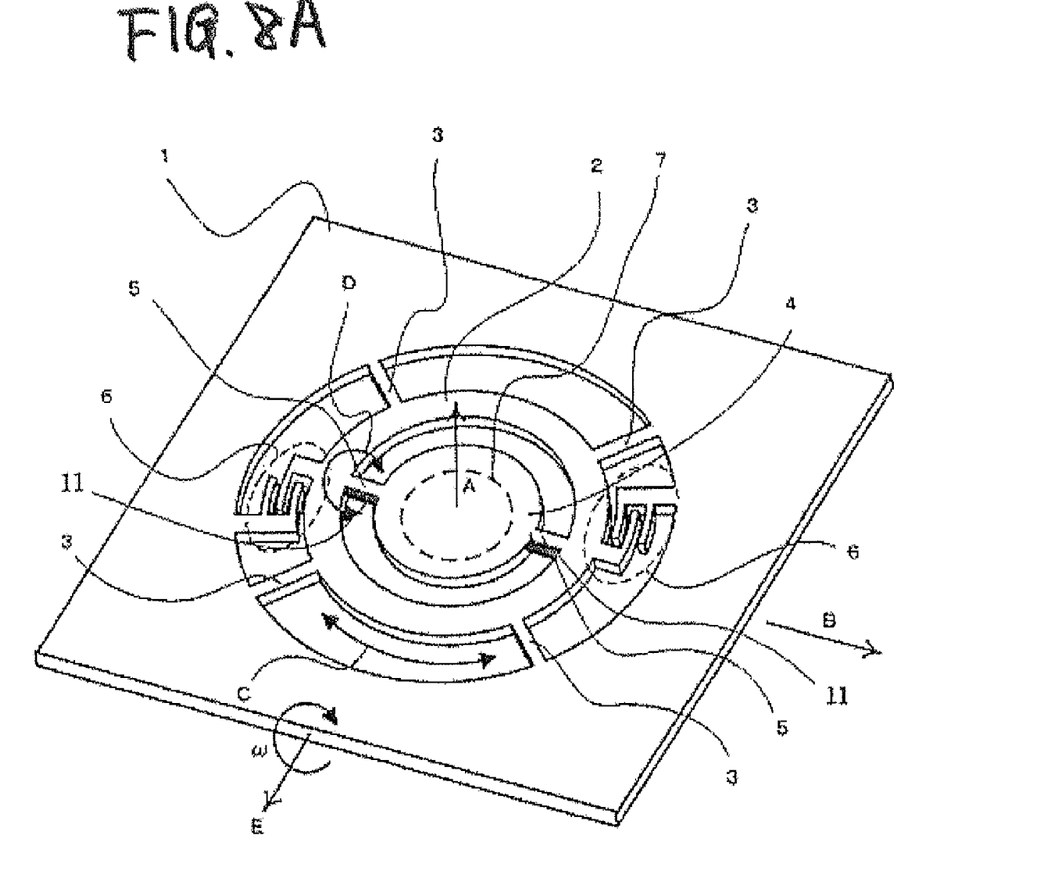
FIGS. 8A and 8B are views for illustrating an angular velocity sensor according to an example embodiment.
Figure 8B:
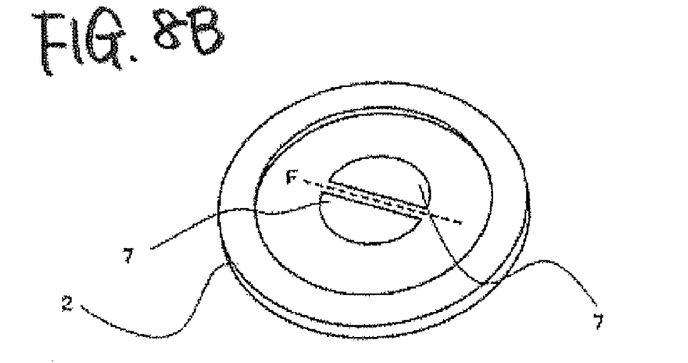

In the examples, through detection of the change of the electrostatic capacity between the parallel electrodes, the detection unit 7 detects the displacement amount of the detection vibrator with respect to the reference vibrator, but the structure is not limited thereto. Any unit can be used as long as it can detect the motion about the rotation axis of the detection vibrator. For example, while the sensitivity is degraded as compared with the case of the detection by the electrostatic capacity, it is possible to adopt a mode in which a strain detection unit 11 including a piezoelectric using a piezoelectric effect or a piezoelectric element using a piezoelectric effect is provided for the support member of the detection vibrator, as shown in FIG. 8A.

Further, in the example, the reference vibrator, the detection vibrator, and the support members are structured as illustrated in the drawings, but the structures thereof are not limited thereto. Any structure can be employed as long as it enables the reference vibrator and the detection vibrator to perform reciprocating rotation about a desired different axis as a center. For example, it is possible to employ a structure in which the reference vibrator is allowed to generate reciprocating rotational vibration by another force as the reference vibration generation unit, while the reference vibrator is levitated by an electrostatic levitation method or a magnetic levitation method.

The angular velocity sensor according to the present invention is capable of detecting an angular velocity with higher accuracy. Accordingly, by the use of the angular velocity sensor according to the present invention, it is possible to, for example, realize a posture detection device and a posture control device with high accuracy. Here, the posture detection device can be used for, for example, detection and correction of blurring due to hand shake of a camera, and car navigation. In addition, the posture control device can be used for, for example, a robot having a posture control function.

By employment of the structure of the angular velocity sensor according to the present invention, it is possible to reduce noise generated in a detection signal by the reference vibration. Accordingly, it is possible to provide a sensor for detecting an angular velocity with high accuracy.

Specifically, also in a case where the reference vibrator has a vibrational component (vibrational wobbling component) other than the reference vibration, it is possible to reduce the noise generated in the detection signal. By employment of the structure of the present invention, in the detection unit, the reciprocating vibrational component or the vibrational wobbling component of the reference vibration is hardly detected (the above-mentioned cause (1) is overcome), so the noise in the detection signal can be reduced. In addition, for example, when the angular velocity is not input to the sensor, it is possible to suppress generation of the vibration of the detection vibrator due to the wobble of the reference vibration (the above-mentioned cause (2) is overcome). Accordingly, the noise in the detection signal can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216694, filed Aug. 9, 2006, which is hereby incorporated by reference herein in its entirety.

The invention claimed is:

1. An angular velocity sensor comprising:
a support substrate;
a reference vibrator supported from a peripheral portion by a first support member formed on the support substrate so as to generate reciprocating rotational vibration about a first rotation axis as a center;
a detection vibrator supported from a peripheral portion by a second support member formed on the reference vibrator so as to generate reciprocating rotational vibration about a second rotation axis, which is different from the first rotation axis, as a center;
a reference vibration generating unit constructed to allow the reference vibrator to generate reciprocating rotational vibration; and
a detection unit coupled to the reference vibrator constructed to detect a relative displacement amount of the detection vibrator with respect to the reference vibrator, which is in association with the reciprocating rotational vibration of the detection vibrator, wherein the detection unit includes a unit for detecting an electrostatic capacity between the reference vibrator and the detection vibrator.

2. The angular velocity sensor according to claim 1, wherein the second support member has an X-shape in cross-section.

3. The angular velocity sensor according to claim 1, wherein the first rotation axis and the second rotation axis are orthogonal to each other.

4. The angular velocity sensor according to claim 3, wherein:
the detection vibrator has a flat-plate shape; and
the first rotation axis is perpendicular to a plane of the detection vibrator when the detection vibrator is placed at a neutral position.

5. An angular velocity sensor comprising:
a support substrate;
a reference vibrator supported from a peripheral portion by a first support member formed on the support substrate so as to generate reciprocating rotational vibration about a first rotation axis as a center;
a detection vibrator supported from a peripheral portion by a second support member formed on the reference vibrator so as to generate reciprocating rotational vibration about a second rotation axis, which is different from the first rotation axis, as a center;
a reference vibration generating unit constructed to allow the reference vibrator to generate reciprocating rotational vibration; and
a detection unit coupled to the reference vibrator constructed to detect a relative displacement amount of the detection vibrator with respect to the reference vibrator, which is in association with the reciprocating rotational vibration of the detection vibrator, wherein the reference vibrator and the detection vibrator are disposed so as to have an opposing surface, and at least one of the reference vibrator or the detection vibrator has a through-hole or a recessed portion on the opposing surface.

6. The angular velocity sensor according to claim 5, wherein the through-hole or the recessed portion is provided such that a number of the through-hole or the recessed portion becomes larger as distance between the through-hole or the recessed portion and the second rotation axis becomes larger.

7. The angular velocity sensor according to claim 5, wherein the first rotation axis and the second rotation axis are orthogonal to each other.

8. The angular velocity sensor according to claim 7, wherein:
the detection vibrator has a flat-plate shape; and
the first rotation axis is perpendicular to a plane of the detection vibrator when the detection vibrator is placed at a neutral position.

9. The angular velocity sensor according to claim 5, wherein the detection unit includes a strain detection unit including one of a piezoresistor or a piezoelectric element which is provided to a support portion for supporting the detection vibrator.

10. An angular velocity sensor comprising:
a support substrate;
a reference vibrator supported from a peripheral portion by a first support member formed on the support substrate so as to generate reciprocating rotational vibration about a first rotation axis as a center;

a first detection vibrator supported from a peripheral portion by a second support member formed on the reference vibrator so as to generate reciprocating rotational vibration about a second rotation axis, which is different from the first rotation axis, as a center;

a second detection vibrator supported by the reference vibrator so as to generate reciprocating rotational vibration about a third rotation axis, which is perpendicular to the second rotation axis, as a center, a reference vibration generating unit constructed to allow the reference vibrator to generate reciprocating rotational vibration;

a detection unit coupled to the reference vibrator constructed to detect a relative displacement amount of the first detection vibrator with respect to the reference vibrator, which is in association with the reciprocating rotational vibration of the first detection vibrator and a relative displacement amount of the second detection vibrator with respect to the reference vibrator, which is in association with the reciprocating rotational vibration of the second detection vibrator.

11. The angular velocity sensor according to claim 10, wherein the first rotation axis and the second rotation axis are orthogonal to each other.

12. An angular velocity sensor comprising:

a support substrate;

a reference vibrator supported from a peripheral portion by a first support member formed on the support substrate so as to generate reciprocating rotational vibration about a first rotation axis as a center;

a first detection vibrator including a detection unit supported from a peripheral portion by a second support member so as to generate reciprocating rotational vibration about a second rotation axis, which is different from the first rotation axis, as a center;

a second detection vibrator including a detection unit supported from a peripheral portion by a third support member so as to generate reciprocating rotational vibration about a third rotation axis, which is different from the first rotation axis and the second rotation axis, as a center;

a reference vibration generating unit constructed to allow the reference vibrator to generate reciprocating rotational vibration; and a detection unit constructed to detect a relative displacement amount of the first detection vibrator or the second detection vibrator with respect to the reference vibrator, which is in association with the reciprocating rotational vibration of the first detection vibrator or the second detection vibrator, wherein the first detection vibrator and the second detection vibrator are configured so as to conduct reciprocating rotation together with the reference vibrator, about the first rotation axis as a center.

13. The angular velocity sensor according to claim 12, wherein each of the first detection vibrator and the second detection vibrator has four detection electrodes divided into quarters by a straight line parallel to the second rotation axis and a straight line parallel to the third rotation axis, and the four detection electrodes provided at the first detection vibrator and the four detection electrodes provided at the second detection vibrator are opposite to each other.

* * * * *